United States Patent [19]
Spencer

[11] Patent Number: 5,455,084
[45] Date of Patent: Oct. 3, 1995

[54] SYSTEM FOR IMPROVING THE APPEARANCE OF PLUMBING FIXTURES

[76] Inventor: Richard C. Spencer, 20253 E. San Gabriel Valley Dr., Walnut, Calif. 91789

[21] Appl. No.: 512,277

[22] Filed: Apr. 20, 1990

[51] Int. Cl.$^6$ ............................................. C09J 7/02
[52] U.S. Cl. .................. 428/33; 428/40; 428/42; 428/56; 428/80; 428/343; 428/66.6
[58] Field of Search ................. 428/33, 40, 42, 428/51, 54, 55, 56, 64, 65, 80, 343, 351

[56] References Cited

U.S. PATENT DOCUMENTS

| | | |
|---|---|---|
| 1,232,419 | 7/1917 | Bacon et al. . |
| 2,309,843 | 2/1943 | Greenspan . |
| 2,713,210 | 7/1955 | Lobachewski . |
| 3,589,403 | 6/1971 | Chase ................................... 138/177 |
| 3,615,984 | 10/1971 | Chase ..................................... 156/94 |
| 4,158,585 | 6/1979 | Wright ................................... 156/94 |
| 4,511,621 | 4/1985 | Thomas et al. ...................... 428/285 |
| 4,959,251 | 9/1990 | Owens ................................... 428/63 |

*Primary Examiner*—Jenna L. Davis
*Attorney, Agent, or Firm*—John J. Posta, Jr.

[57] ABSTRACT

A laminate repair sheet is useful for altering the appearance of the visible face of a nozzle. The sheet comprises a plastic upper layer, a middle layer of tacky, water-resistant adhesive, and a bottom layer of a release material. Annular rings comprising the upper layer and the middle layer can be peeled from the bottom release layer for application to nozzles of varying diameter.

11 Claims, 1 Drawing Sheet

SYSTEM FOR IMPROVING THE APPEARANCE OF PLUMBING FIXTURES

BACKGROUND

The present invention relates to a system for beautifying plumbing fixtures.

A common household problem is an unsightly drain nozzle in a bath tub, sink, or shower. These nozzles are generally made of metal, and with time, the visible face plate or flange portion of the nozzle becomes unsightly due to discoloration and/or corrosion.

Present day solutions to this problem are generally unsatisfactory. One option is to replace the nozzle, which is expensive. Moreover, the nozzle often matches the faucets. Thus, not only does the nozzle need to be replaced, but many times for aesthetic reasons, the homeowner will also need to replace the faucets, which greatly adds to the expense.

Another solution to the problem is to use a touch-up paint. However, a color match is difficult, and thus the touched-up portion may not match the original color.

Another reason homeowners may wish to change the appearance of these nozzles is for decorative purposes. For example, if a bathroom is redecorated, some homeowners may wish to have the nozzle color match the color of the new paint or wall paper in the bathroom.

Accordingly, there is a need for a system that alters the appearance of the visible flange of a nozzle, where the system is easy to use, inexpensive, and durable.

SUMMARY

The present invention is directed to a system that satisfies this need. The system uses a laminate repair sheet comprising three plies, an upper ply, a bottom ply, and a middle ply. The upper ply is made of a flexible, corrosion-resistant, attractive-in-appearance plastic. The bottom ply comprises a release material. The middle ply is a tacky, water-resistant adhesive that is in contact with and sandwiched between the upper and bottom plies. The three plies are of substantially the same shape with substantially co-extensive edges. The middle adhesive ply is substantially permanently secured to the upper plastic ply, and the bottom release ply is easily removed from the middle adhesive ply.

So that the sheet can be used for a variety of different size nozzles, the upper ply comprises a plurality of concentric, annular segments so that a plurality of rings can be peeled from the bottom release ply for attachment to the faces of a plurality of nozzles. Each ring comprises one of the annular segments of the upper plastic ply adhered to a corresponding annular segment of the middle adhesive ply.

The concentric rings are sized to correspond to the size of nozzles conventionally found in the home. Thus, by buying one repair sheet, a homeowner is able to beautify more than one nozzle. Accordingly, it is not necessary to supply different size repair sheets. One size repair sheet can service many of the nozzles commonly found in the home. This provides great economies in manufacture and distribution because a large number of different size repair sheets are not needed.

DRAWINGS

These and other features, aspects and advantages of the present invention will become better understood with reference to the following description, appended claims, and accompanying drawings where:

DESCRIPTION

Figure 1:
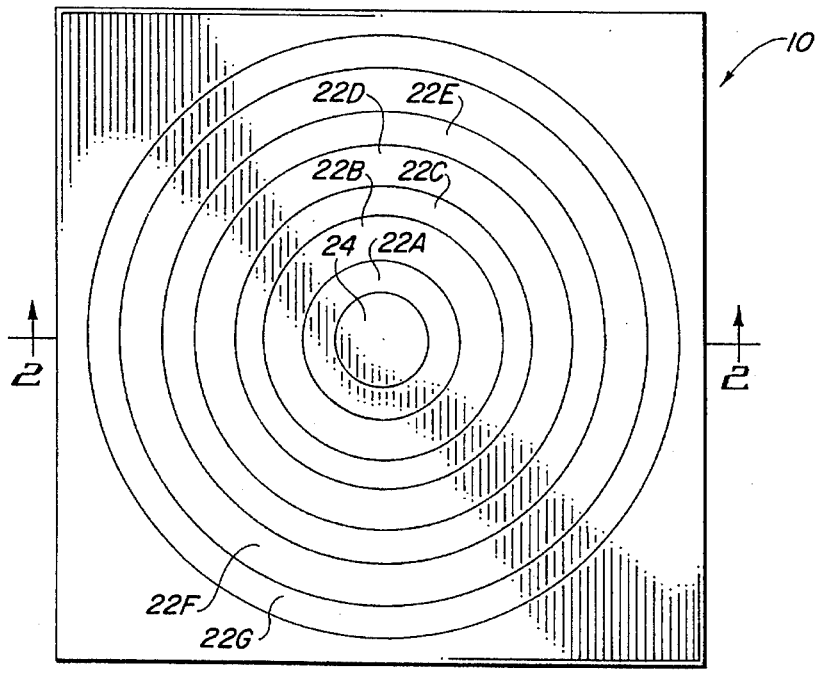
FIG. 1 is a top plan view of a laminate sheet having features of the present invention.
Figure 2:
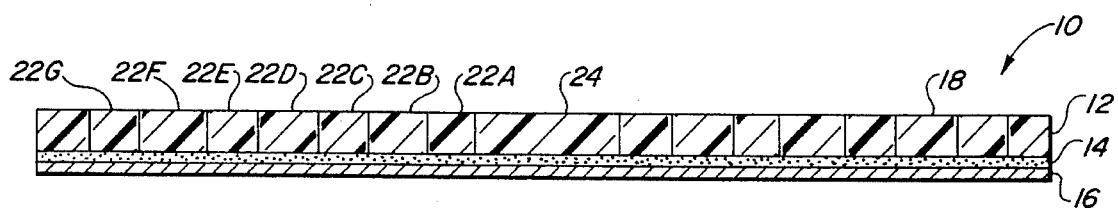
FIG. 2 is a sectional view of the sheet of FIG. 1 taken on line 2—2 of FIG. 1.

The present invention provides a system for altering and improving the appearance of the visible face or flange of any one of a plurality of nozzles of varying diameter, the nozzle having a central opening. With reference to FIGS. 1 and 2, a sheet 10 according to the present invention comprises three layers or plies sandwiched together, a top or upper ply 12, a middle ply 14, and a bottom ply 16. The relative thickness of the plies shown in FIG. 2 are not necessarily drawn to scale. The overall thickness of the sheet can be from about 0.1 to about 0.3 inches, and preferably is slightly larger than about 0.2 inch thick.

As shown in FIG. 1, the sheet can be generally rectangular, including square, in planar configuration. However since the sheet 10 comprises circular annular rings, the sheet 10 can just as well be circular.

The top ply 12 is formed of a flexible, corrosion-resistant, attractive-in-appearance plastic. The top surface 18 of the upper ply 12 is what is visible when installed, and it is this surface that needs to be attractive. Preferably it is smooth and shiny. Generally it is metallic in color, such as silver or gold. However, it can also have any other color suitable for decorative purposes, such as yellow, green, red or blue. Moreover, it can be embossed with a pattern such as stripes or checks to accommodate differing tastes of consumers.

The top ply 12 can be made of any material which is stain resistant, water resistant, has a long life when installed, and can be adhered by means of an adhesive to metal. Suitable plastic materials include vinyl (polyvinylchloride), polyethylene, polypropylene, polyesters and acrylics.

The top ply 12 needs to be sufficiently thick that it is durable, yet not so thick that it has insufficient flexibility for easy installation. Preferably the top ply is from about 0.003 to about 0.3 inch thick, and most preferably about 0.2 inch thick.

The middle ply 14 comprises a tacky (at room temperature), water-resistant adhesive that is adapted to substantially permanently bond the top layer 12 to a metal surface. Suitable adhesives include acrylic and rubber. The adhesive layer can be from about 0.0005 to about 0.20 inch thick, and preferably is about 0.001 inch thick.

The bottom ply 16 is a release material that prevents the adhesive layer 14 from prematurely sticking to a surface or the packaging for the sheet 10. The bottom ply 16 adheres to the adhesive layer 14 with less force than does the top plastic layer 12 so that the release layer 16 can be peeled from the adhesive 14, leaving the top layer 12 and the middle layer 14 attached together for installation. Suitable release layers 16 include paper stock such as kraft or crepe paper, which can be silicon treated, or plastic coated paper. Typically, the release layer 16 is from about 0.003 to about 0.10 inch thick.

As shown in FIG. 2, the three plies preferably are of substantially the same shape with substantially co-extensive edges. The sheet 10 can be prepared using conventional lamination technology.

The top ply is segmented such as by die cutting to form a plurality of concentric, annular segments 22 leaving a center plug 24 within an innermost segment 22A. The segments are identified in FIG. 1 from the innermost to the outermost as segments 22A, 22B, 22C, 22D, 22E, 22F and 22G.

The inner and outer diameters of the segments are chosen so that the segments match the inner and outer diameter of standard flanges of drain nozzles. For example, segment 22A can have an inner diameter of about 1¼ inches and an outer diameter of about ½ inch to fit a standard bathroom sink drain; segment 22B can have an inner diameter of about 2¾ inches and an outer diameter of about ½ inch to fit a standard kitchen sink drain; segment 22C can have an inner diameter of about 1¾ inches and an outer diameter of about ½ inch to fit a standard tub drain nozzle; and the outermost segment 22C can have an inner diameter of about 3¾ inches and outer diameter of about ½ inch to fit a standard shower drain nozzle. If the outermost segment 22G has an outer diameter of 4¼ inches, then sheet 10 can be a square, having sides of a length of 5½ inches.

It is not necessary that the entire sheet 10 be segmented. It is possible to provide only a few segments of a predetermined size, leaving large areas of the sheet available for customization by the user.

When one of the segments 22 is peeled from the backing or release paper 16, the result is a ring 26 (FIG. 3) comprising the annular segment 22 of the top ply 12 and a corresponding annular segment of the adhesive ply 14. The adhesive ply is peeled from the bottom ply with the top ply because the adhesive ply adheres to the top ply with a much stronger force than the adhesive ply adheres to the bottom ply 16.

Figure 3:
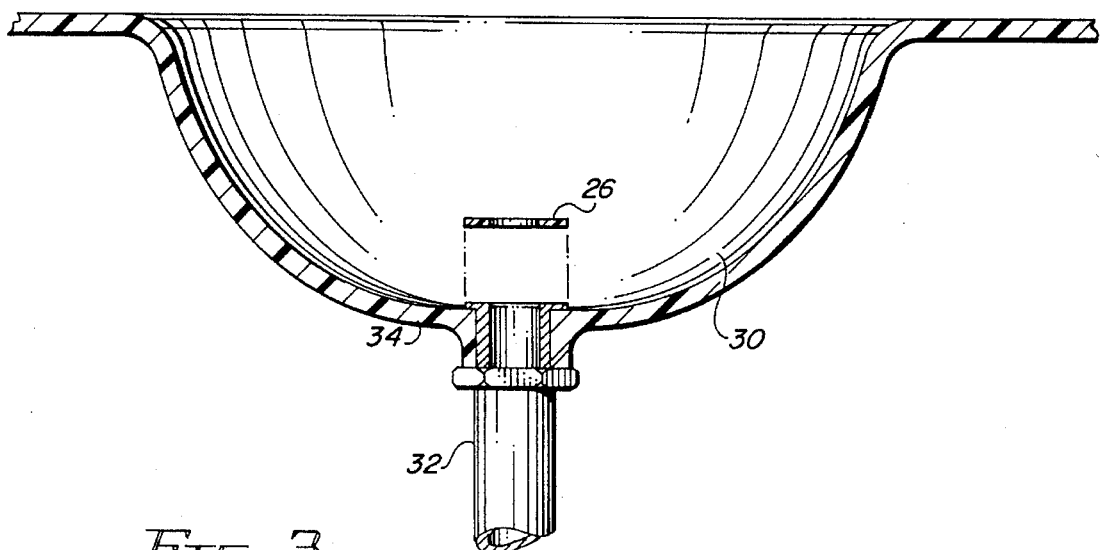
FIG. 3 schematically demonstrates a laminate sheet of the present invention being applied to a nozzle.

The repair sheet 10 is easy to use. FIG. 3 shows a wash basin 30 provided with a drain nozzle 32 having a corroded flange 34. To cover up the corrosion and restore the appearance of the sink, the ring 26 which has been peeled from sheet 10 is adhered to the top surface of the flange 34, with the adhesive of the ring 26 in direct contact with the flange 34. The ring 26 has an outer diameter substantially the same as the outer diameter of the flange 34 and has an inner diameter substantially the same size as the inner diameter of the flange 34, and thus of the opening of the nozzle.

The inner plug segment 24 of the sheet 10 can be used for covering a solid surface, such as the drain stop or plunger found in many bathroom sinks.

Suitable materials for forming the three plies are available through a variety of sources. Also, it is possible to obtain from a variety of vendors the three layers already laminated together. For example, the Converter Specialties Division of 3M Industrial Specialties of St. Paul, Minn. has a satisfactory white vinyl label stock available under the product designation Scotch Mark™ 7091. This label stock comprises a top flexible vinyl layer of about 0.0038 inch thick, a middle acrylic adhesive layer of about 0.001 inch thick, and a bottom layer of 90-pound double-coated kraft paper of about 0.0067 inch thick.

The present invention has significant advantages. The sheet 10 is inexpensive to manufacture and simple to use. It can be provided in a variety of textures, finishes and colors. It is much less expensive and easier to use than either replacing a nozzle or attempting to paint the nozzle. It provides a durable solution to a problem that plagues many homeowners.

The sheet 10 is particularly economical, because one sheet can be used by a homeowner for more than one nozzle. It also is not necessary to manufacture a large number of different size sheets to accommodate different size drain nozzles.

Although the present invention has been described in considerable detail with reference to certain preferred versions thereof, other versions are possible. Therefore, the spirit and scope of the appended claims should not be limited to the description of the preferred versions contained herein.

What is claimed is:

1. A laminate repair sheet for altering the appearance of a visible face of any one of a plurality of nozzles of varying diameter, each nozzle having a central opening, the sheet comprising:

(a) an upper ply of a flexible, corrosion-resistant, attractive-in-appearance plastic;

(b) a bottom ply of a release material; and (c) a middle ply of a tacky, water-resistant adhesive, the middle ply being in contact with and sandwiched between both the upper and bottom plies, wherein the middle adhesive ply is substantially permanently secured to the upper plastic ply and the bottom release ply is easily removed from the middle adhesive ply, the upper plastic ply comprises a plurality of concentric, annular segments divided by cuts in the upper ply, and a plurality of rings, each comprising one of the annular segments of the upper plastic ply adhered to a corresponding annular segment of the middle adhesive ply, and each being separable from the bottom release ply for attachment to the face of a nozzle having a corresponding size and shape for improving the appearance of the face of the nozzle.

2. The laminate repair sheet of claim 1 wherein the annular segments are formed by die cutting the upper ply.

3. The laminate repair sheet of claim 1 comprising a circular segment for attachment to a circular plug, the circular segment comprising (i) a central section of the upper plastic ply within the innermost annular segment of the upper ply, and (ii) a corresponding central section of the middle adhesive ply.

4. The sheet of claim 1 wherein the three plies are of substantially the same shape with substantially coextensive edges.

5. Article of manufacture for repair or restoration of a visible face of nozzles of varying diameter or a plug for the nozzles, each nozzle having a central opening, the article comprising three coextensive layers:

(a) a top layer of a flexible, corrosion-resistant plastic;

(b) a middle layer of a tacky, water-resistant adhesive; and (c) a bottom layer of a release paper, wherein the adhesive is substantially permanently secured to the top layer and the release layer is easily removed from the adhesive, the top layer being segmented to form a plurality of separable concentric rings each having an inner diameter and a central plug region wherein any one of the rings can be peeled from the release paper with middle layer adhesive attached thereto for attachment to the face of a nozzle having a diameter corresponding to its inner diameter.

6. The article of claim 5 wherein the adhesive layer is segmented to form a plurality of concentric regions corresponding to the concentric rings of the top layer.

7. The sheet of claim 1 in which the upper ply comprises polyvinylchloride.

8. The sheet of claim 1 wherein the middle ply comprises acrylic.

9. The article of claim 5 which the top layer comprises polyvinylchloride and the middle layer comprises acrylic adhesive.

10. The laminate repair sheet of claim 1 wherein the upper ply is substantially uniform in thickness.

11. The article of manufacture of claim 5 wherein the top layer is substantially constant in thickness.

* * * * *